No. 865,703.

PATENTED SEPT. 10, 1907.

A. L. HOOVER.

VINE SEPARATOR FOR POTATO DIGGERS.

APPLICATION FILED JUNE 22, 1907.

WITNESSES:

Arthur L. Hoover,
INVENTOR.

By C. A. Snow & Co.
ATTORNEYS

UNITED STATES PATENT OFFICE.

ARTHUR LEWIS HOOVER, OF AVERY, OHIO.

VINE-SEPARATOR FOR POTATO-DIGGERS.

No. 865,703.

Specification of Letters Patent.

Patented Sept. 10, 1907.

Application filed June 22, 1907. Serial No. 380,310.

*To all whom it may concern:*

Be it known that I, ARTHUR LEWIS HOOVER, a citizen of the United States, residing at Avery, in the county of Erie and State of Ohio, have invented a new and useful Vine-Separator for Potato-Diggers, of which the following is a specification.

This invention has relation to vine separators for potato diggers and it consists in the novel construction and arrangement of its parts as hereinafter shown and described.

The object of the invention is to provide a potato digger with a separator of the character indicated. The mechanism of the separator consists primarily of a hopper located at the rear of a potato digger and which is provided with a conveyer bottom moving transversely with relation to the digger. A separating conveyer moves orbitally about the said hopper. The said separating conveyer moves in alinement with the digger and transversely of the hopper and the slats of the said conveyer are spaced at such intervals apart as to permit the roots to pass through and enter the hopper but prevent the vines and foliage of the plants from entering the hopper as the said vines are carried by the conveyer beyond the rear side of the hopper and deposited upon the ground.

Figure 1:
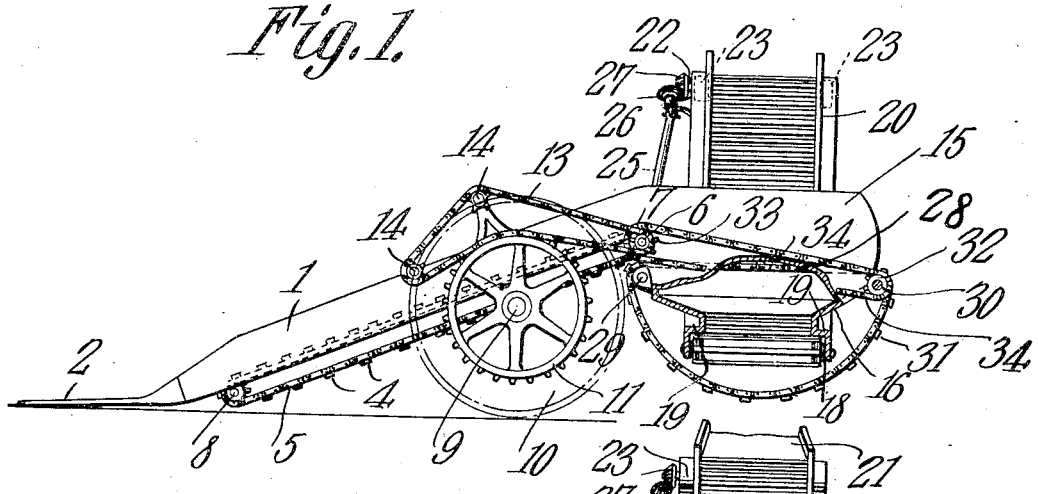
Figure 2:
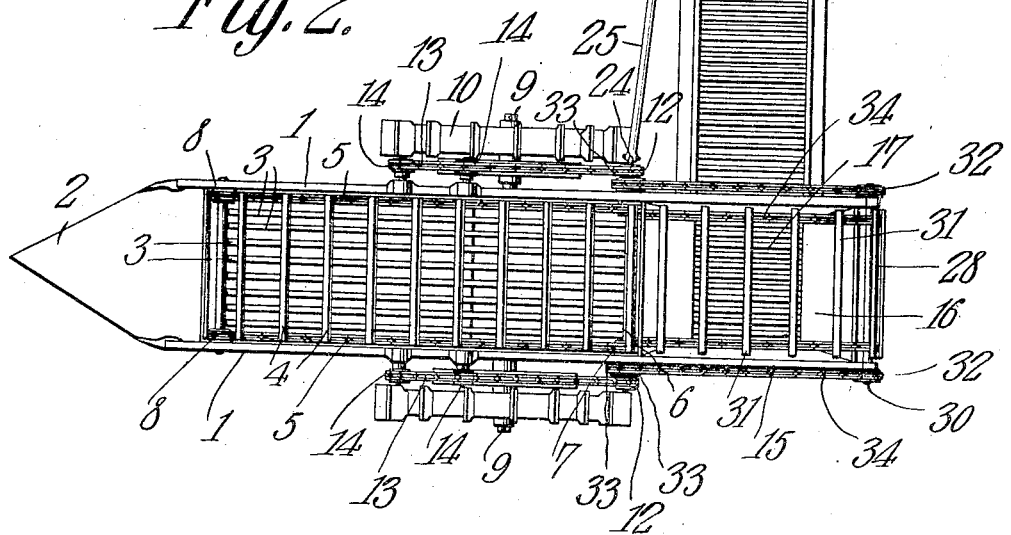

In the accompanying drawing:—Figure 1 is a side elevation of a potato digger with the separator attached thereto and shown partly in section. Fig. 2 is a top plan view of the digger and separator.

The potato digger consists of the side bars 1 having the digging point 2 attached at their forward ends and the spaced slats 3 located between them. The cross slats 4 are attached at their ends to the chains 5 and form a conveyer for elevating the potatoes, vine, weeds, etc. from the ground. The shaft 6 is journaled for rotation at the upper portions of the side bars 1 and the sprocket wheels 7 are fixed to the said shaft. The chains 5 pass around the sprocket wheel 7 and similar sprocket wheels 8 journaled for rotation at the lower end portions of the side bars 1. The side bars 1 are mounted upon an axle 9 which in turn is supported by the traction wheels 10. The said axle rotates with the said wheels. The sprocket wheels 11 are fixed to the axle 9 and the sprocket wheels 12 are fixed to the shaft 6 in alinement with the sprocket wheels 11. The chains 13 pass around the sprocket wheels 12 and over the sprocket wheels 14 and engage the sides of the sprocket wheels 11 whereby the sprocket wheels 12 are caused to rotate in the opposite direction from that in which the sprocket wheels 11 rotate. The rear portions of the side bars 1 extend back substantially horizontally as at 15 and the hopper 16 is supported below the lower edges of the horizontal portions of the said side bars. The hopper 16 is provided with a conveyer bottom 17 which consists of a series of parallel slats supported at their ends by the sprocket chains 18. The sides of the hopper 16 are formed from what is known as Z-iron and consequently they have the intermediate horizontal portions 19 which lie over the chains 18. The sides of the said hopper 16 lie transversely under the side bars 1 and are upwardly inclined as at 20 and are provided with a chute 21 at their upper ends. The shaft 22 is journaled for rotation at the upper end portions of the inclined extensions 20 and the chains 18 pass around the sprocket wheels 23 fixed to the said shaft. One end of the shaft 6 is provided with a universal joint 24 to which is attached one end of a shaft 25. The opposite end of the last said shaft is provided with a beveled pinion 26 which meshes with a similar pinion 27 fixed to the shaft 22. The vine separating conveyer 28 is mounted upon the shafts 29 and 30 and passes around the hopper 16. The said conveyer 28 is located immediately in the rear of the elevator of the potato digger. The separator 28 is made up of a series of slats 31 which are spaced apart at such distance as to permit the roots of the plants to pass through but which retain the foliage and vines thus effecting separation. The sprocket wheel 32 is fixed to the shaft 30 and a sprocket wheel 33 is fixed to the shaft 6 in alinement with the sprocket wheel 32. The sprocket chain 34 passes around the sprocket wheels 32 and 33.

From the foregoing description it is obvious that as the digger is drawn along the ground and the potatoes are dug and elevated together with the vines, weeds, etc. along the slats 3 that most of the earth will be sifted from the vegetation through the space between said slats and that the potatoes, together with the vines and weeds, will be deposited upon the separating conveyer 28. As the upper portion of the said conveyer moves rearwardly with relation to the digger the vines and weeds are carried beyond the rear side of the hopper 16 and are deposited upon the ground immediately behind the potato digger; at the same time the roots pass through the spaces between the slats 31 and fall upon the bottom 17 of the hopper 16 and are carried by the said bottom along the inclined extensions 20 of the hopper and are deposited into the chute 21 from whence they may fall into a suitable receptacle such as a wagon body or its equivalent.

Having described my invention what I claim as new and desire to secure by Letters-Patent is:—

In combination with a digger having an elevator, a hopper attached to the digger below the end of the elevator, said hopper having a movable conveyer bottom which moves transversely with relation to the digger, a vine separator moving over the hopper and in alinement with the digger, means for transmitting movement from the digger elevator to the vine separator and means for transmitting movement from the digger elevator to the hopper bottom.

In testimony that I claim the foregoing as my own, I have hereto affixed my signature in the presence of two witnesses.

ARTHUR LEWIS HOOVER.

Witnesses:
M. E. HAWLEY,
FRED A. ROBERTS.